United States Patent [19]

Haung et al.

[11] 4,188,048
[45] Feb. 12, 1980

[54] WHEEL SUSPENSION

[75] Inventors: Bernard Haung, Canton, Mich.; Evgeny I. Rivin, Windsor, Canada

[73] Assignee: Ford Motor Company, Dearborn, Mich.

[21] Appl. No.: 930,440

[22] Filed: Aug. 2, 1978

[51] Int. Cl.$^2$ .............................................. B60G 11/24
[52] U.S. Cl. ....................................... 280/688; 16/44; 267/63 A
[58] Field of Search ........ 280/688; 267/63 A, 57.1 R; 16/31 R, 44, 45, 107; 403/225, 79; 152/212, 385

[56] References Cited

U.S. PATENT DOCUMENTS

| | | | |
|---|---|---|---|
| 2,043,725 | 6/1936 | Anderson | 267/63 A |
| 2,700,173 | 1/1955 | Huffman | 16/44 |
| 4,000,914 | 1/1977 | Wragg | 267/63 A |

*Primary Examiner*—Philip Goodman

*Attorney, Agent, or Firm*—Peter Abolins; Clifford L. Sadler

[57] ABSTRACT

This specification discloses a resilient wheel suspension wherein a wheel is rotationally mounted upon an axle and the axle is resiliently suspended with respect to a mounting plate. The resilient suspension includes an elastomer disk which is coupled along one major surface to the axle and along the other major surface to the mounting plate. Lateral movement of the axle causes a shear to be applied in the elastomer disk. The suspension can have nonlinear characteristics by having a plurality of elastomer disks and metal disks with central openings for passing the axle and successively coupled to adjacent disks between a coupling to the axle and a coupling to the mounting plate. The size of the opening diameter increases in successive disks going from the disk adjacent to the axle to the disk adjacent to the mounting plate.

11 Claims, 2 Drawing Figures

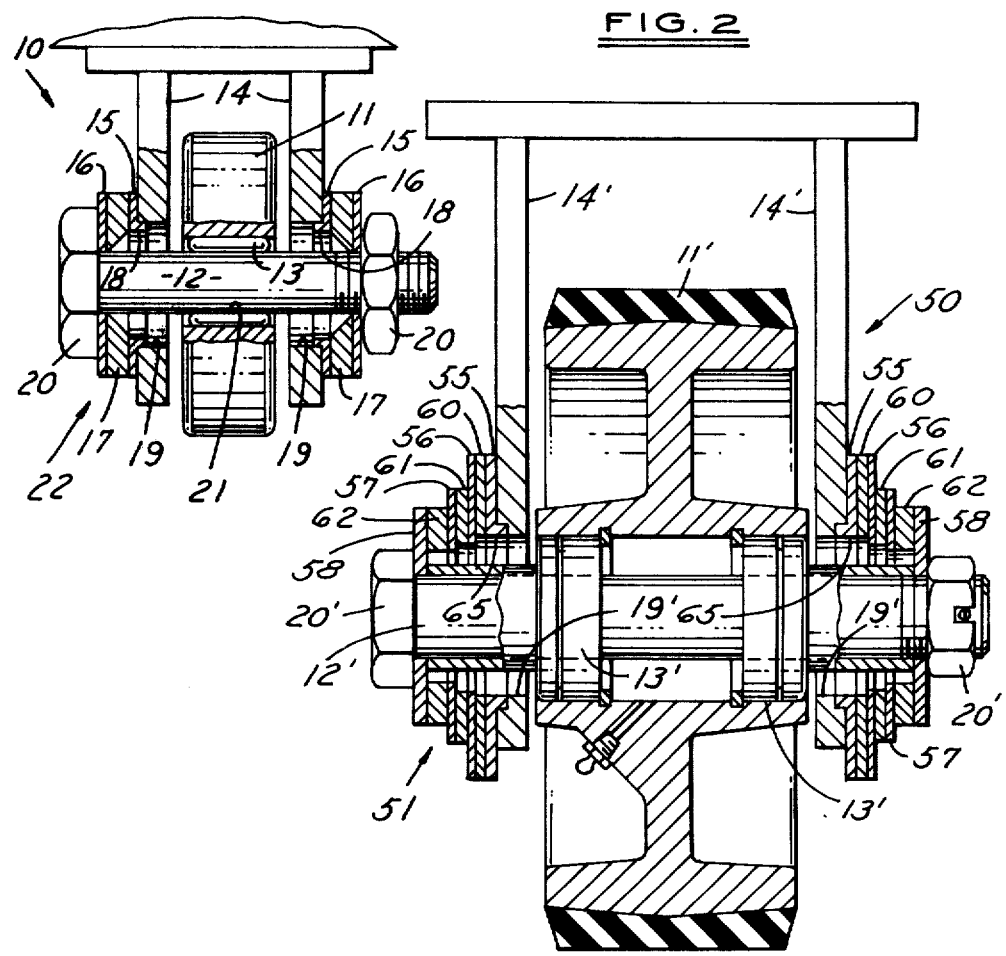

4,188,048

WHEEL SUSPENSION

BACKGROUND OF THE INVENTION (1) Field of the Invention

This invention relates to wheels and, more particularly, to resiliently cushioned wheels.

(2) Prior Art

Relatively hard, high capacity tires are often used in transport devices such as carts or industrial lift trucks used in production facilities of any number of products. While the use of such tires reduces rolling resistance and increases the load capacity of the cart, they produce a relatively hard ride for operator of the vehicle. Further, the shock loading imposed on cart components such as the axle and frame when the wheel goes over bumps or other irregular surfaces, tends to be relatively high and causes relatively fast wear of the wheel the cart components, and the floor.

Improved suspensions for in-plant dollies or other in-plant transportation vehicles have typically employed relatively expensive and elaborate spring suspension systems which can be likened to those of the automobile. Clearly, it would be desirable to reduce the wear on the cart wheels and on the floor without incurring substantial expense for an improved suspension. These are some of the problems this invention overcomes.

U.S. Pat. No. 3,072,169 issued to R. Hastings, Jr. on Jan. 8, 1963 and entitled "Resilient Wheel" teaches a wheel which has a shearing ring bonded between the wheel and the axle. The axle is not movable with respect to the axle mounting and the shear member is mounted between the wheel and the axle. As a result, increasing the size of the shear member necessitates the corresponding increase in the size of the wheel. Such an increase is undesirable because it adds weight and typically requires more substantial ball bearing for supporting the wheel. Again, all this adds to the cost of the suspension. Further, the patent only teaches a linear suspension wherein there is only provided the same amount of resilient resistance even as the wheel approaches the absolute limit of its travel. Thus, when the wheel does reach the limit of its travel, there may be an undesirably large shock loading.

U.S. Pat. No. 2,700,173 issued to L. D. Huffman on Jan. 25, 1955 and entitled "Cushioned Caster" teaches a relatively complex cushioning mechanism whereby the axle of the caster wheel is off set from a torsional cushioning member and swings with respect to the torsional cushioning member. The complexity of the cushioning mechanism results in a corresponding increase in cost. A U.S. Patent to Chesnut, No. 1,734,326 issued Nov. 5, 1929 and entitled "Caster Wheel" attempts to provide some of the cushioning through the tread and thus avoid the problem of having a hard tire altogether. However, such a solution also reduces the load capacity of the caster wheel. U.S. Pat. No. 2,669,448 issued to W. W. Cushman on Feb. 16, 1964 and U.S. Pat. No. 629,229 issued to C. Ballin on July 18, 1899 teach suspension systems including rubber balls which are required to twist and turn as the wheel turns with respect to the wheel mounting. Again, a relatively simple and less expensive solution would be desirable.

SUMMARY OF THE INVENTION

This invention recognizes that a wheel suspension for reducing shock loading and increasing floor and wheel wear can include a pair of spaced side walls resiliently supporting a wheel therebetween. An elongated axle extends through opposed openings in the side walls so that the axle has end portions extending beyond the side walls. A wheel is rotationally mounted on the axle between the side walls. A pair of resilient means coupling end portions of the axle to an adjacent one of the side plates each include a pair of spaced cover plates attached to an elastomer therebetween. One of the cover plates is also attached to the axle and the other cover plate is also attached to one of the side walls so that movement of the axle in a radial direction with respect to the side walls applies a shear force to the elastomer.

The invention further recognizes that a nonlinear suspension is particularly advantageous for reducing axle movement as the limit of axle travel is approached. In accordance with one embodiment of this invention, a plurality of elastomer members coupled between the side walls and the axle with separating disks positioned between each of the adjacent elastomer members generate a non-constant force to deflection ratio which increases with the approach of the limit of axle travel. The separating disks are sized so as to succeedingly land on the axle as the axle travels for increasing load. That is, increasing deflection of the axle more than proportionately increases the damping force supplied by the elastomer members to limit travel of the axle.

An embodiment of this invention provide a relatively inexpensive way for damping wheels thereby increasing the life of wheels. The particularly embodiment of this invention in which it provides a nonlinear suspension is particularly advantageous because it substantially reduces the occurrence of any shock caused by the axle reaching the limit of its travel.

BRIEF DESCRIPTION OF THE DRAWINGS

FIG. 1 is a front elevational view, partly sectional, of a wheel suspension in accordance with an embodiment of this invention wherein a single pair of elastomer disks are used to supply a linear suspension force; and FIG. 2 is a front sectional view similar to FIG. 1 wherein in accordance with an embodiment of this invention, a wheel suspension uses three pairs of elastomer disks to provide a nonlinear suspension force.

DETAILED DESCRIPTION OF THE INVENTION

Referring to FIG. 1, a wheel suspension 10 includes a wheel 11 which rotates on an axle 12. Axle 12 passes through a pair of aligned and opposing openings 19 in a pair of spaced planar and generally parallel side walls 14. Bearings 13 are mounted within a central axial opening 21 of wheel 11 and are adjacent the outer surface of axle 12. A resilient connection 22 between the ends of axle 12 and side walls 14 includes a pair of inner cover plates 15 having a disk shape with a central opening and attached to the outside of side walls 14 around openings 19. The connection can be made by such means as welding or fitting. Inner cover plates 15 each have protruding annular bosses 18 for sitting in openings 19 of side walls 14.

Resilient connection 22 further includes a pair of elastomer members 17 having a generally disk shape with a central axial opening for passing axle 12 and bonded to the outer surface of inner cover plate 15. A pair of outer cover plates 16 have a disk shape similar to inner cover plate 15 with an axial opening defining an inner diameter. However, the inner diameter of outer cover plate 16 is smaller than the inner diameter of inner cover plate 15 so that radial movement of axle 12 causes interference, first between outer cover plates 16 and axle 12 and then interference between axle 12 and inner cover plates 15. Elastomeric members 17 are bonded to both the adjacent surfaces of inner and outer cover plates 15 and 16 so that movement of outer cover plates 16 is damped or resisted in that a shear force is applied to elastomeric members 17. Nuts 20 are attached to the outer ends of axle 12 and abut the outer surfaces of outer cover plates 16. Advantageously, at least one of the nuts has internal threads mating with external threads on axle 12 so that nuts 20 can be tightened toward each other and apply a compressive force on elastomeric members 17. Such compressive force can be used to reinforce the bonding force between elastomeric members 17 and cover plates 15 and 16 of wheel suspension 10.

The assembly of wheel suspension 10 typically includes forming generally circular openings 19 in side walls 14 and attaching side walls 14 to the cart or truck which is to be supported. Elastomeric members 17 are bonded between inner cover plates 115 and outer cover plates 16. The inner sides of inner cover plates 15 are attached to the outer faces of side walls 14 adjacent openings 19. Wheel 11 is positioned between side walls 14 and axle 12 is threaded through openings 19 and central opening 21 of wheel 11. Attaching nut 20 to the ends of axle 12 prevents axle 12 from slipping out and provides for compression of elastomeric members 17.

In operation, wheel suspension 10 provides a linear suspension or damping force when deflection of wheel 11 causes deflection of axle 12. That is, the travel of axle 12 is radially limited by the radially most inward portion of inner cover plates 15 and side walls 14 around openings 19. That is, elastomeric members 17 continue to increasingly deflect until axle 12 hits against the limit of travel which, as illustrated in FIG. 1, is the innermost boundary of inner cover plates 15. Further movement of axle 12 causes corresponding movement of side walls 14 and, indeed, of the truck or cart which is supported. The force for damping or suspension provided by elastomeric member 17 as they are deflected or sheared from a rest position to a maximum displacement is linear with respect to the displacement of axle 12.

Referring to FIG. 2, a nonlinear suspension or damping force can be obtained from a wheel suspension 50 wherein like numbered components are similar to the components of wheel suspension 10. Bearings 13' are attached to the interior of wheel 11' and against the outside surface of axle 12'. Openings 19' and side walls 14' pass the ends of axle 12' to nuts 20' which are at the end of axle 12'. However, in contrast to wheel suspension 10, a resilient connection 51 includes three pairs of elastomeric members 60, 61 and 62 and four pairs of cover plates 55, 56, 57 and 58 which all have a central axial opening defining an inner diameter. Inner cover plates 55 each have protruding annular bosses 65 for sitting in openings 19' of side walls 14'.

The pair of cover plates 55 is adjacent the exterior of side walls 14' around openings 19'. Continuing successively outward from cover plates 55, there is a pair of elastomeric members 60, a pair of cover plates 56, a pair of elastomeric members 61, a pair of cover plates 57, a pair of elastomeric members 62 and a pair of cover plates 58. Nuts 20' abut the outermost extremity of resilient connection 51 and can be tightened to apply compressive force to resilient connection 51. Elastomeric members 60, 61 and 62 are each bonded to the adjacent cover plates 55 through 58 so that deflection of cover plates 55 through 58 causes a shear force to be applied to elastomeric members 60, 61 and 62.

Both the elastomeric members and the cover plates have decreasing diameters as resilient connection 51 extends outwardly from side walls 14' to the connection with axle 12. The inner diameter of outermost cover plates 58 is substantially equal to the outer diameter of axle 12' and responds immediately to movement of axle 12'. The deflection created by such movement is applied to the adjacent elastomeric members 62. When axle 12' has deflected sufficiently to engage the larger inner diameter of the next innermost cover plates 57 then cover plates 57 also moves with further movement of axle 12. As a result, there is no further increase in the applied shear force to elastomeric members 62 but there is an increase in the applied shear force in the elastomeric members 61, inward of cover plates 57. Similarly, when deflection of axle 12' is such that the outer surface of axle 12' strikes the inner diameter of cover plates 56, there is no further increase in the shear force applied to pairs of elastomeric members 61 and 62 but there is additional shear force applied to elastomeric members 60. Finally, when the outer surface of axle 12' reaches the innermost diameter of cover plates 55 no further increase in the shear force is applied to elastomeric members 60, 61 and 62 and no further deflection of axle 12' may be realized.

The above described sequence in the increase in stiffness introduced successively by stopping elastomeric members 60, 61 and 62 from further deformation provides a nonlinear suspension system. That is, when the two cover plates adjacent an elastomeric member both contact axle 12' there is no further deformation of the elastomeric member between the cover plates and wheel suspension 50 has an increased stiffness. Such a suspension system is particularly advantageous because there can be effective damping of a relatively broad range of travel of axle 12' without it being necessary to have particularly high damping at the beginning of travel of axle 12'. Instead, there can be a substantial increase in the damping force as axle 12 approaches the end of its travel.

Advantageously, cover plates 55 through 58 are made of a metal which is nonresilient and is easily attached to both side walls 14' and elastomeric members 60, 61 and 62. Elastomeric members 60 through 62 are sufficiently resilient that the opposing major faces of each member can be displaced with respect to each other by distances equal to the differences between the radii of the central axial openings of adjacent cover plates. The material of the elastomeric member is chosen so that for this displacement there is a desired shear force resistance. The size and number of layers of elastomer will be determined for each application according to the payload range and the desired dynamic characteristics of the system which includes the caster and the payload.

The amount of shear stiffness supplied by elastomeric members 60, 61 and 62 is also dependent upon the radial extent of each of the members. As shown in FIG. 2, the outer diameters of elastomeric members 60 through 62 are also decreased in accordance with the decreasing inner diameter of the elastomeric members 60 through 62. Similarly, the outer diameter of cover plates 55 through 58 decrease. It should be recognized that the damping force provided by resilient connection 51 can be varied by varying the outer diameter of the elastomeric members and cover plates. Further, the inner and outer diameters of each the cover plates and each of the elastomeric members need not be constant with axial distance along axle 12' or 12. For example, the outer diameter of the elastomeric members may vary so that there is a smooth connection between the outer diameters of adjacent cover plates.

The elastomer members in accordance with this invention do not rotate and as such are not subject to varying deflection as a function of the speed of rotation. Such deflection causes heat loss due to such reasons as hysterisis which results in energy being dissipated without performing useful suspension work or forward travel. The nonrotating elastomeric rings are flexed only when a load is applied to the wheel and that there is no deflection as a result of wheel rotation alone. Further, the relative position of the elastomeric members with respect to the wheel suspension is advantageous in that there is sufficient room radially outward and axially outward for a variety of elastomeric configurations.

Various modifications and variations will no doubt occur to those skilled in the various art to which this invention pertains. For example, the resilient connection may extend inward from the side walls to connection with the axle instead of, as shown, extending outwardly. These and all other variations which basically rely on the teachings through which this disclosure has advanced the art are properly considered within the scope of this invention.

We claim:

1. A wheel suspension for movable object including:
   a pair of spaced side walls having opposed openings;
   an elongated axle extending between said side walls and through said opposed openings so that said axle has end portions adjacent said side walls;
   a wheel rotationally mounted on said axle between said side walls;
   a pair of resilient means coupling the end portions of said axle to an adjacent one of said side plates, said resilient means each including a pair of spaced cover plates having an elastomer therebetween and attached to said cover plates, a first of said cover plates being attached to said axle and a second of said cover plates being attached to one of said side walls so that movement of said axle in a radial direction with respect to said side walls applies a shear force to said elastomer and a damping force to the wheel suspension;
   said first of said cover plates is annular and has an inner diameter substantially equal to the diameter of said axle so that radial movement of said axle causes corresponding radial movement of said first cover plate thereby applying a shear force to said elastomer and thus resisting motion of said axle with respect to said side plate and;
   said second of said cover plates is annular and has an inner diameter sufficiently larger than the diameter of said axle to permit some radial movement of said axle which movement is limited by interference with the innermost boundary of said opening in said side plate and said inner diameter of said second cover plates.

2. A wheel suspension as recited in claim 1 wherein said elastomer has an outer boundary extending between the outer diameter of said first and second cover plates and an inner diameter extending between the inner diameter of said first and second cover plates.

3. A wheel suspension as recited in claim 1 further comprising an adjustable compression means axially positionable along said axle to provide a compressive force on said elastomer thereby reinforcing the bonding force between said elastomer and said cover plates.

4. A wheel suspension for a movable object including:
   a suspension support means for attaching said wheel suspension to the movable object;
   an elongated axle for providing an axis of rotation;
   a wheel rotationally mounted on said axle; and resilient means for coupling said axle to said suspension support means, said resilient means including a plurality of elastomer members and connecting means for attaching adjacent elastomer members to each other, said connecting means being successively deflectable by said axle so that a shear deformation occurs substantially successively to said elastomer members;
   said elastomer members and said connecting members being alternately positioned along the axial length of said axle to form a deflectable member, a first extremity of said deflectable member relatively closely following the radial movement of said axle with respect to said suspension support means; a second extremity of said deflectable member following said suspension support means, thus being relatively movable with respect to said deflectable member intermediate said first and second extremities decreasingly following relative movement between said axle and said suspension support means with increasing distance from said first extremity toward said second extremity so as to provide a nonlinear suspension for said wheels with increasing relative displacement between said axle and said suspension support means successively applying an increasing shear force to elastomer members progressively closer to said second extremity so that said connecting means are successively positioned adjacent said axle to limit shear deformation of successive ones of said elastomer members.

5. A wheel suspension for a movable object including:
   a suspension support means for attaching said wheel suspension to the movable object;
   an elongated axle for providing an axis of rotation;
   a wheel rotationally mounted on said axle; and resilient means for coupling said axle to said suspension support means, said resilient means including a plurality of elastomer members and connecting means for attaching adjacent elastomer members to each other, said connecting means being successively deflectable by said axle so that a shear deformation occurs substantially successively to said elastomer members;
   said elastomer members and said connecting members being alternately positioned along the axial length of said axle to form a deflectable member, a first extremity of said deflectable member relatively closely following the radial movement of said axle with respect to said suspension support means; a second extremity of said deflectable member following said suspension support means, thus being relatively movable with respect to said deflectable member intermediate said first and second extremities decreasingly following relative movement between said axle and said suspension support means with increasing distance from said first extremity toward said second extremity so as to provide a nonlinear suspension for said wheels with increasing relative displacement between said axle and said suspension support means successively applying an increasing shear force to elastomer members progressively closer to said second extremity so that said connecting means are successively position adjacent said axle to limit shear deformation of successive ones of said elastomer members;

said suspension support means is a pair of spaced side walls having opposed openings for passing said axle so that said axle extends beyond said side walls and said deflectable member having said first extremity adjacent the outer extremity of said axle and said second extremity adjacent said side wall, said elastomer members being generally annular with a central axial opening for passing said axle; and said connecting means are metal discs with central, axial openings, the outer diameter of said disks being equal to the outer diameter of an adjacent elastomer member in the direction of said side wall, and the inner diameter of said disks being equal to the inner diameter of an adjacent elastomer in the direction away from said side wall.

6. A wheel suspension as recited in claim 5 wherein: said resilient means includes at least two annular elastomer members, each being bounded by a pair of metal disks, at least one of said disks each being common to two of said elastomer members and two of said disks being common with only one of said elastomer members.

7. A wheel suspension as recited in claim 5 wherein the inner diameter of said elastomer members positioned at progressively increasing distances from said side walls have a decreasing inner diameter and the inner diameter of each of said elastomer members is substantially constant across the axial extent of each of said elastomer members.

8. A wheel suspension as recited in claim 5 wherein the outer diameter of each of said elastomer members decreases with increasing distance from said side walls, the outer diameter of each of said elastomer members being substantially constant across the axial extent of each of said elastomer members.

9. A wheel suspension as recited in claim 5 wherein the innermost disk adjacent said side walls has a flange adjacent the inner diameter of said disk which extends into said opening of said side walls thereby providing additional support for said disk.

10. A wheel suspension as recited in claim 5, further comprising a compression means for reinforcing the bonding force between said metal disks and said elastomer members, said compression means including a nut in a threaded engagement with said axle and longitudinally movable along said axle so as to apply a force against the outermost of said disk thereby applying a force to said elastomer between said side wall and said outermost disk.

11. A wheel suspension including:

a pair of spaced side walls having opposed openings;

an elongated axle extending between said side walls and through said opposed openings so that said axle has end portions extending beyond said side walls;

a wheel rotationally mounted on said axle between said side walls, said wheel including bearing means for facilitating rotation of said wheel about said axial;

a pair of inner cover plates attached to said side walls around said opposed openings, said inner plates being disk shaped and including a central opening for passing said axle;

a pair of first elastomer members having annular disk shape, a central opening for passing said axle and being attached to said inner cover plate along a major surface of said cover plate and said first elastomer members;

a pair of first separating disks of a metal material attached to said first elastomer member, said first separating disk having a central opening for passing said axle and having a diameter less than the central opening of said inner cover plate;

a pair of second elastomer members attached to said first separating disk, said second elastomer member having an annular disk shape with an inner diameter and an outer diameter less than those of said first elastomer member and having a central opening therein for passing said axle;

a pair of second separating disks having a central opening therein for passing said axle and having an inner diameter less than the inner diameter of said central opening of said first separating disk;

a pair of third elastomer members having a central opening therein for passing said axle and having an inner diameter less than the inner diameter of said second elastomer disk;

a pair of outer cover plates having a disk shape with a central opening for passing said axle, so that said axle abuts said outer cover plate and radial movement of said axle causes corresponding radial movement of said outer cover plates; and said opposed said opposed openings of said side walls having a larger diameter than the diameter of said central opening of said outer cover plates and relative movement between said axle and said side walls is confined within the limits of said opposed openings of said side walls.

* * * * *